Figure 1:
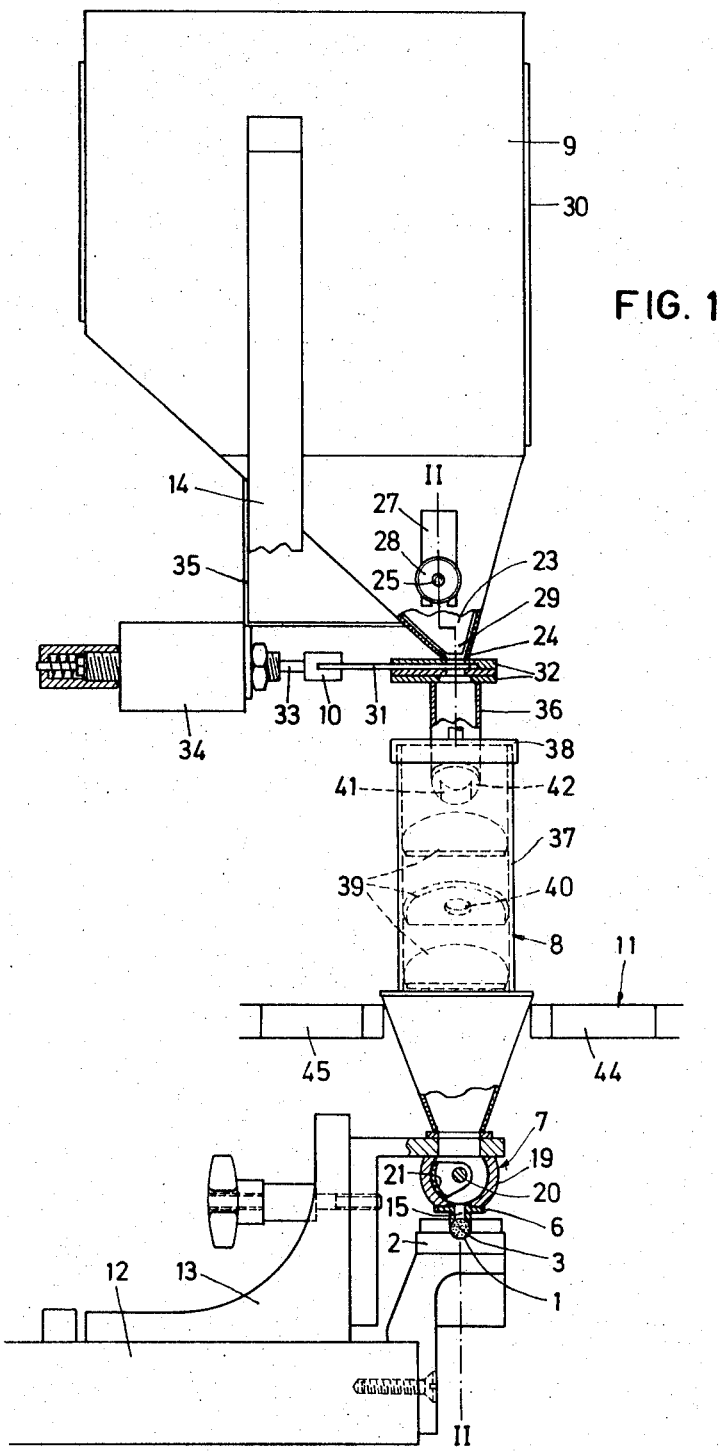

United States Patent
Artho et al.

[11] 3,844,541
[45] Oct. 29, 1974

[54] METHOD OF FILLING CIGARETTE FILTERS AND DEVICE FOR CARRYING OUT THE METHOD

[75] Inventors: Antoine Artho; Pascal Muriset; Bernard Henzelin, all of Boncourt, Switzerland

[73] Assignee: F. J. Burras & Cie, Boncourt, Canton of Berne, Switzerland

[22] Filed: Nov. 13, 1972

[21] Appl. No.: 306,158

[52] U.S. Cl. .................................. 259/4, 259/180
[51] Int. Cl. .......................... B01f 15/04, B01f 5/00
[58] Field of Search ......... 259/4, 18, 150, 180, 151, 259/147, 2, 36, 164, 165

[56] References Cited
UNITED STATES PATENTS

| 2,854,714 | 10/1958 | Dietert | 259/154 |
| 2,877,524 | 3/1959 | Bishop | 259/154 |
| 3,083,423 | 4/1963 | Hartley | 259/154 |
| 3,326,536 | 6/1967 | Zingg | 259/154 |

*Primary Examiner*—Robert W. Jenkins
*Attorney, Agent, or Firm*—Stevens, Davis, Miller & Mosher

[57] ABSTRACT

A process and apparatus for filling a chamber made between two coaxial cylindrical elements of a cigarette filter with a mixture of flowable products wherein each product is stored separately in distinct reservoirs located above a loading funnel opening laterially into a conduit through which pass said filter elements spaced from one another. The particles flow from the reservoirs into a free-fall zone in the loading funnel where they form a homogeneous mixture. The flow rates are adjusted by automatic means and suction is applied to remove dust particles.

14 Claims, 4 Drawing Figures

PATENTED OCT 29 1974

3,844,541

SHEET 1 OF 3

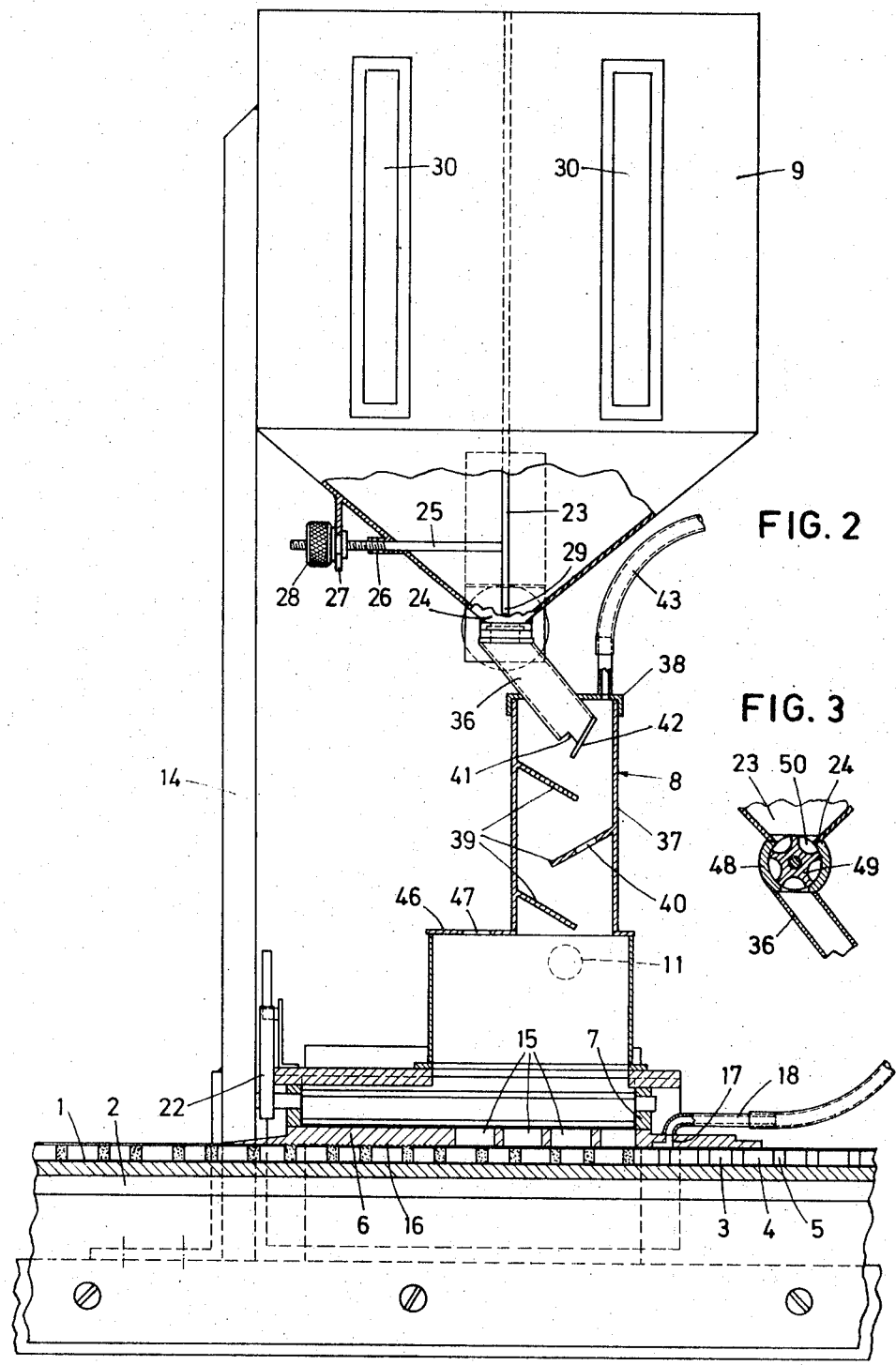

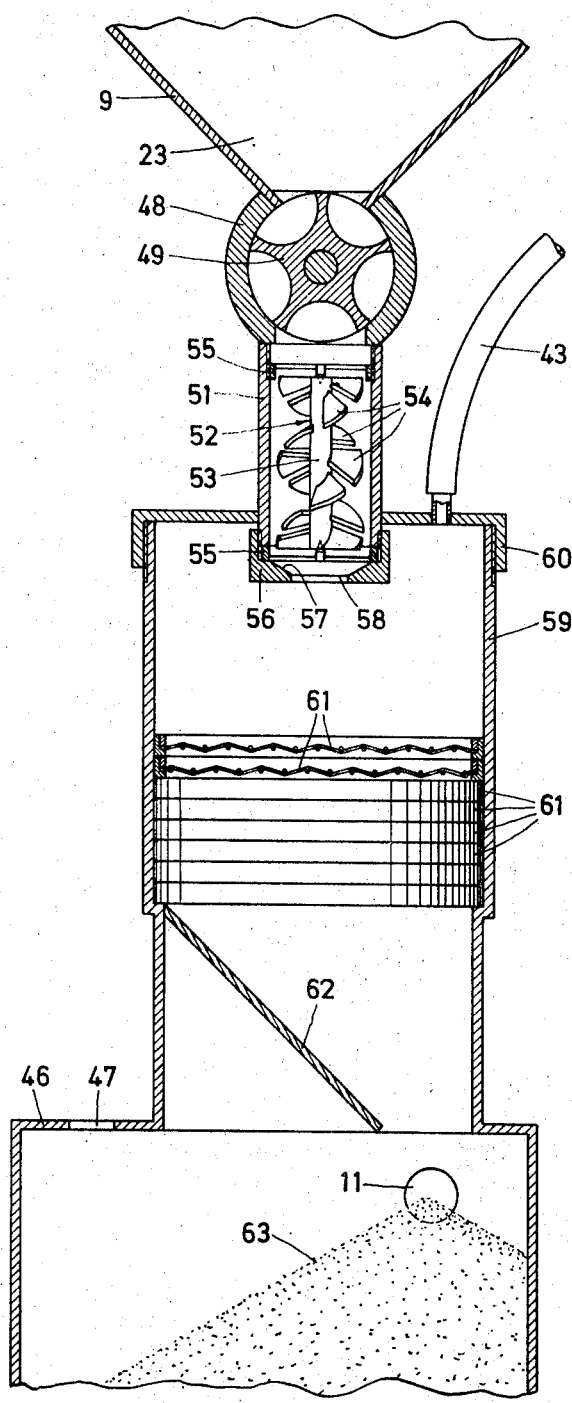

3,844,541

METHOD OF FILLING CIGARETTE FILTERS AND DEVICE FOR CARRYING OUT THE METHOD

The present invention relates to a method of filling a chamber contrived between two coaxial cylindrical elements with a mixture of fluid products, according to which method the said products are caused to run into a hopper, the opening of which issues laterally into a conduit through which the said filter elements travel, kept spaced from one another, and a suction of the air contained in the said chamber is produced in order to encourage the passage of the products from the hopper into the chamber.

The invention also relates to a device for carrying out the method, this device comprising a hopper, at least two bins placed above the hopper, a conduit which is at least approximately horizontal, disposed beneath the orifice of the hopper, and means for causing equidistant fibrous elements, partially surrounded by a wrapper, to pass into the conduit.

The problem of filling products in granules or in capsules into chambers contrived within cigarette filters is already known, and various devices have already been suggested for accomplishing this filling. Thus devices of the above-mentioned type are known in which, for example, a shaft with longitudinal cavities is placed beneath the bins in such a way that the cavities pass successively into the bottom opening of the first bin, then into that of the second. Thus the cavities are filled successively, first with a first product, then with a second one. This known device does not accomplish the mixing of the products.

According to other known methods and devices, especially those taught by Swiss Patent No 517,448, filed on Oct. 12, 1970 (Application No. 15101/70), a suction of the air is produced which encourages the penetration of the fluid products into the chambers contrived between the filter elements. This suction can be effected through the elements themselves by a suction-pipe connected to the side wall of the conduit before it reaches the hopper. The method and device described in the aforementioned Swiss patent make it possible to produce cigarette filters including not only fibrous elements upon which the volatile products resulting from the combustion of tobacco are deposited by condensation, but also in which certain gaseous products resulting from that same combustion are absorbed selectively by a chemical effect due to the presence of a product which generally takes the form of granules in a chamber contrived between two fibrous elements of the filter.

Subsequent research aiming to find products capable of playing better and better the part of a selective absorbent for the gaseous products have shown that it was advantageous to provide mixtures of granulated products as the products for filling the internal chambers of the filters, e.g., a mixture formed of granules of active carbon, on the one hand, and of granules of a special chemical compound, on the other hand.

Therefore, mixtures of fluid products as homogeneous as possible have been prepared, by means of which the bin of the device described in the aforementioned patent was filled.

However, that method had several drawbacks. First of all, it was necessary to prepare the mixture of products in advance and to stock it in containers; but when the ingredients of the mixture were of different densities, the heavier particles had a tendency to concentrate at the bottom of the containers, and it was difficult to keep a mixture homogeneous.

In the second place, the product-mixing operation, which was generally carried out in a drum rotating around a horizontal axis, necessarily involves the breakage of some of the granules and their reduction to dust, which means a loss of material. Furthermore, the dust thus formed got into the hopper and from there into the filters, which decreased their quality.

It could be foreseen that these drawbacks would crop up in an even more disconcerting manner as soon as more complicated mixtures were envisaged, of three or more products instead of a homogeneous mixture of two products.

Moreover, the numerous handling operations and the precautions necessitated by the preparation of the homogeneous mixture, its storage, its transportation, and the filling of the feeding hopper under conditions suitable for guaranteeing the maintenance of its good quality were not compatible with the requirements of profitability and efficiency which are essential in the manufacture of cigarette filters.

The object of the present invention is therefore to make possible under acceptable output conditions, and guaranteeing the good quality of the product obtained, the manufacture of cigarette filters containing a homogeneous mixture of several fluid products, especially several granulated products.

To this end, the method according to the invention is characterized in that the said products are disposed in separate bins placed above the hopper, their discharge at the outlet of the bins is so adjusted that they fall free into the hopper, and in the space where the said free-fall takes place, a homogeneous mixture of the said products is formed, and the dust is sucked upward.

It has indeed been found that the fluid products used, which for the most part are products in granules of perceptibly spherical shape, produce much less dust if they are mixed during a free-fall as their extraction from the bins proceeds than if the operation is carried out in a rotary drum and if the mixture is then stored for a more or less long time. Moreover, the provision of a hopper through at least part of the length of which the fluid products pass in a free-fall makes it possible to apply suction to the upper part of the hopper and thus to exhaust the dust formed as a result of the impacts suffered by the granules while being mixed.

The device according to the invention is characterized in that it includes means for adjusting the outlet discharge from the bins into the hopper, controlled in terms of the level of the piling up of fluid material in the bottom of the hopper so as to maintain a free-fall zone therein, means for mixing the said fluid products, and suction means situated in the said free-fall zone.

The accompanying drawing shows, by way of example, two embodiments and a variant of the device according to the invention and illustrates an embodiment of the method.

FIG. 1 is an elevation view of the device, partially cut away, in the direction of movement of the filter elements, FIG. 2 is a sectional view of that device along the line II—II of FIG. 1, FIG. 3 is a partial view of a variant, and FIG. 4 is a partial view of another embodiment.

The filling device shown in the drawing is inserted in a cigarette-filter production line which includes a conveyor belt 1 moving throughout the length of the installation. In the area of the filling device, this belt is guided by guide 2 which keeps it curved in a U-shape, so that it also keeps in that shape a filter wrapper laid in advance on belt 1. It is in the channel formed by this wrapper that filter elements 3 and 4 are disposed, which can be of the same or different lengths, each element being separated from the following one by a space forming a chamber 5, the dimensions of which are strictly defined by the device introducing elements 3 and 4 (which device is not shown in the drawing)

The essential elements of the filling device are rail 6, measuring dispenser 7, hopper 8, container 9, gate 10, and its control device 11. This assembly is mounted on a base 12 by means of adjustable bracket 13 which supports hopper 8, measuring dispenser 7, and rail 6, and by means of upright 14 to which container 9 is secured.

Rail 6 is of the type described in the aforementioned patent. It is disposed horizontally above belt 1. Its lower face is concave so as to correspond in shape to the upper surfaces of filter elements 3 and 4, and it is adjusted in height so that these elements slide without play under its lower face. In the filling zone, it has openings 15 through which the filter product runs into chambers 5. Past these openings, it has a toothed zone 16 intended to keep back any granules which may have got in between the side face of one of the elements 3 or 4 and the rail, and which might be held in that spot when the wrapper is folded over elements 3 and 4. At its upper end, the rail has an opening 17 to which is connected a suction conduit 18. The air is permanently drawn through whichever of the filter elements is situated between opening 17 and the first chamber 5 communicating with one of the openings 15, which ensures the exhaust of the air in the chambers 5 at the base of the hopper and makes it possible for these chambers to be well filled.

In the embodiment shown in the drawing, a measuring dispenser 7 is inserted between rail 6 and hopper 8. This dispenser is composed of a generally cylindrically shaped casing 19 parallel to rail 6, within which pivots a shaft 20 equipped with a cut-off 21. This cut-off is laid against the inner face of casing 19. Control means shown schematically at 22 (FIG. 2) make it possible to adjust the position of the cut-off and, consequently, the free width of openings 15, in terms of the size of the granules in the mixture in order to obtain the desired discharge of material. An embodiment of such a cut-off has been described in detail in the patent specification cited above. The presence of this cut-off also makes it possible to keep the filling product from running out of the hopper when the machine is stopped.

The product gathered at the base of hopper 8 is a homogeneous mixture of two distinct products, both composed of spherical granules of a few tenths of a millimeter in diameter. One of these products will be active carbon, for example, and the other a substance having a complementary action on the ingredients of the smoke. It is in hopper 8, which has a special conformation, as will be seen further on, that the mixture of the two products takes place; and container 9, which feeds the hopper, is divided into two bins, each containing a supply of one of those products. This container 9 comprises an upper part, rectangular in section, and a pyramid-shaped lower part. It is divided in two by a simple sheet-metal partition 23 disposed vertically. This partition conforms in shape to the profile of container 9 and extends downward to the level of outlet opening 24, of small diameter, which container 9 has at its lower end. The partition is connected to its front and back walls only in the upper part. A rod 25 is secured to partition 23, a little above the lower edge thereof. This rod passes through a guide-pipe 26 secured to the wall of the wall of container 9 and a hole contrived in a flange 27, likewise secured to the bin. A milled nut 28 screwed on the threaded outer end of rod 25, by acting on the resiliency of partition 23, therefore makes it possible to adjust precisely the position of its lower edge 29 within opening 24 and, consequently, to measure out the relative discharges of the two products, each of which is placed in one of the compartments delimited by wall 23. This arrangement makes it possible to adjust the proportions of the mixture which it is desired to obtain in a very simple manner. Elongated windows 30 contrived in the front wall of bin 9 make it possible to check the level of the products contained in the two bins at any time.

Outlet opening 24 of container 9 issues into gate 10, which is composed of a plate 31 having an opening of the same dimensions as opening 24, and of two fixed guide plates 32 guiding plate 31, which is integral with a control rod 33. This rod passes through a magnetic control cylinder 34 of conventional design secured by flange 35 to upright 14 supporting the bin. The outlet of gate 10 is connected to a square-sectioned tube 36 which, in the embodiment shown in the drawing, extends obliquely and enters hopper 8.

Hopper 8 is composed of two parts : a mixing shaft in its upper part and the hopper itself situated in its lower part. The mixing shaft is formed of a tube 37 closed by a lid 38. It is equipped with deflection plates 39 fastened obliquely in the tube. One or more of these plates can, as shown in FIG. 2, have an opening 40. The number and arrangement of these plates will be chosen according to the types of products to be mixed so as to obtain the desired homogeneous mixture. It will be seen, as a matter of fact, that the two products contained in bin 9 run out on each side of partition 23 through the opening of gate 10 when it is open and pass into square or cylindrical tube 36, whence they run out through opening 41 contrived at the lower end of that tube, diverted by plate 42 onto the first of the baffles 39. From there, the products fall from one baffle to the other, sliding over them or passing through opening 40, and finally fall into the hopper itself, which has a conventional trapezoidal cross-section. It has been found that this simple baffle arrangement ensures a sufficiently homogeneous mixture in the course of the fall of the products from the end of tube 36 down to the bottom of the hopper.

The lower part of hopper 8, in which the homogeneous mixture piles up so as continuously to feed measuring dispenser 7 is longer in the direction of rail 6 than the mixing shaft and extends farther along toward the lower end of rail 6 than does that shaft. It has a flat upper wall into which the shaft issues and which is pierced by openings 47.

Lid 38 of the hopper is likewise pierced by an opening connected to a suction tube 43. Thus there is established a circulation of air from openings 47 toward the top of the mixing shaft, due to which the dust which can result from the fall of the granules onto deflection plates 39 is drawn into tube 43. The homogeneous mixture which accumulates in the bottom of hopper 8, and which is drawn off as it forms by measuring dispenser 7, can therefore be made perfectly free of dust.

Control device 11 of gate 10 regulates the filling of the filters in terms of the discharge of elements 3 and 4 passing through conduit 1 and, consequently, in terms of the volume of chemical products evacuated by that conduit. It comprises a light source 44 and a photoelectric cell 45, shown schematically in FIG. 1. These two members are placed coaxially one on each side of the trapezoidal portion of hopper 8. The light beam from lamp 44 goes through the wall of the hopper, which will preferably be made of a transparent material but which can also be provided with port-holes at the appropriate height. It acts on cell 45 as long as the pile of mixed products in the bottom of the hopper does not attain a level high enough to block it. Thus it suffices to connect photoelectric cell 45 to magnetic control cylinder 34 of gate 10 so as to have that gate shut as soon as the light beam from lamp 44 is interrupted, in order to ensure the regulation of the device. When measuring dispenser 7 has evacuated a quantity of the mixture sufficient to make the level of the heap of products drop below the light beam from lamp 44, gate 10 opens automatically, and the products contained in the bins run out again through mixing shaft 37. If it were so desired, however, a control device could be conceived which adjusts the position of gate 10 in a fixed position such that the discharge of products leaving bin 9 would be exactly adjusted to the discharge which is evacuated by measuring dispenser 7 and, finally, by the conveyor belt.

Other means could also be used to detect the level attained by the pile of material in the lower chamber of the hopper, e.g., a mechanical sensor, a proximity detector, or any other means of measuring levels.

In the case where the proportions of the two ingredients are fixed, it is preferable to use the device shown in FIG. 3 for regulating the discharge of the different products contained in the compartment of container 9, instead of gate 10 and movable partition 23. In that figure, separating partition 23 is fixed. Opening 24 issues into the upper portion of a cylindrical tube 48 equipped with longitudinal cavities 50. A driving device (not shown) continuously rotates shaft 49 so that the cavities fill up with granules when passing by opening 24 and pour out their contents into channel 36 after having passed opposite the walls of tube 48. In certain cases, this arrangement ensures a better dosage of the various products to be mixed. It has indeed been found that according to the size of the granules of the products, and according to their nature, their degree of fluidity can vary within quite broad limits. Thus cavities of different dimensions, chosen in terms of the natural fluidity of the different ingredients of the mixture, can be provided in the portions of shaft 49 which face each of the compartments of container 9. Shaft 49 could also be composed of several portions driven at differing speeds. This solution will be particularly advantageous, especially where the mixture which has to be introduced in the chambers 5 of the filters comprises more than two ingredients and where it would not be possible to regulate the relative discharges of the ingredients solely by adjusting the positions of the intermediate partitions.

Of course, where the discharge is regulated by means of shaft 49 with cavities, the rotation of that shaft is controlled by the level detector. It is indeed obvious that when that shaft is fixed, the bottoms of the bins are blocked, and the products stop running out. The mixing device described above ensures a homogeneous mixture satisfying the requirements in practice in the usual cases. However, it has been found that in numerous cases, according to the dimensions and the structure of the various products to be mixed, it was advantageous to use a mixing device made up like the one shown in FIG. 4. In that device, there is again to be found the lower part of bin 9, with partition 23, shaft 49 with cavities which rotates in tubular casing 48, and the lower part of the hopper provided with cover 46. However, between that cover and casing 48 is placed a mixing device made up in the following way:

Under casing 48 there is secured a pyramid-shaped connection which conducts the products discharged by shaft 49 with cavities into a first cylindrical well 51 within which is secured a mixing screw 52. This part is secured to the inside of well 51. It has blades 54, distributed in a double-threaded spiral around a central shaft 53 and disposed so that each blade is situated immediately above a gap between two blades of the succeeding turn. Part 52 is secured by two cross-pieces 55 inside of well 51, which is provided at its lower end with a nozzle 56 equipped with a inner surface 57 in the shape of a truncated cone and with an opening 58. The mixture of products running over blades 54 of the first threading falls into the gaps between the blades, is picked up by the blades of the second threading, falls again between them, etc., which ensures an intimate mixture of the various ingredients. Finally, the mixed heap is concentrated by surface 57 and falls into the middle of the second well 59. This well is larger than well 51. Its lid 60 is equipped with the suction device 43, and halfway up it there are a series of baffles 61 consisting of coarse-mesh netting. The wires of these various sections of netting are oriented differently. Thus the mixture of products falling through opening 58 is again diffused over the whole surface of well 59, passing through baffles 61, then is gathered together at the upper side of the well by deflector plate 62. These various means ensure a completely homogeneous mixture even when the particles are of a different nature. The heap of the mixture of particles is shown at 63, with this heap extending up to the level of the beam 11 which is part of the detector. It has indeed been found that it was advantageous for the heap 63 of particles to attain its maximum height at the upper side of the hopper with respect to the direction of movement of filter elements 3 and 4 so that the filling might take place rapidly right away.

The filling method described above makes it possible to reload periodically each of the bins containing products which make up the filling mixture without its being necessary to carry out a mixing operation beforehand. Avoided in that way are the necessary mixing apparatus and the necessity of storing not only the ingredients of the mixture, but also the prepared mixture. Material losses stemming from the fact that an appreciable proportion of the granules were broken in the mixing drums used previously, and the resultant increased production of dust, are avoided. On the contrary, it has been found that by carrying out the mixing in the feeding hopper, by a free fall of the two products on the baffles of the mixing shaft or well, a perfectly homogeneous mixture with only a slight proportion of dust was obtained. Moreover, this dust can be drawn off in the upper part of the mixing shaft.

It is then necessary to adjust the discharge leaving the bins so that the heap of the mixture accumulating in the bottom of the hopper constantly attains the same level and continuously maintains the length of fall necessary to do the mixing; but when that is done, the heap of the homogeneous mixture at the bottom of the hopper is likewise regulated at a constant height and, consequently, its compression, too, is regulated. This compression is relatively slight, which facilitates the entry of the granules into chambers 5 under the action of the suction produced by suction-pipe 18.

The method thus makes it possible to simplify the filter filling operation and to improve the quality of that filling. Moreover, it makes it possible to increase the filling speed and, consequently, the speed at which the filter elements move in the guide conduit situated below the hopper. It therefore makes it possible to increase the production capacity of the entire production line.

What is claimed is:

1. A device for filling, with a mixture of fluid products, a chamber contrived between a pair of coaxial cylindrical elements moving along a conduit in a spaced relationship, said device comprising:
    a. a plurality of bins, each bin containing fluid products to be mixed, said bins having a discharge outlet;
    b. a hopper disposed beneath said bins whereby fluid products discharged from said bins outlet fall freely into said hopper, said hopper also disposed in communication with said conduit, said hopper comprising:
        i. a free-fall zone, initially receiving said fluid products discharged form said bins, in which a homogeneous mixture of said fluid products is formed prior to accumulation thereof at the bottom of said hopper,
        ii. means for mixing said fluid products, and
        iii. suction means disposed in said free-fall zone to create a sub-atmospheric pressure in said hopper and to suck dust upwardly away from the homogeneous mixture; and
    c. means for adjusting the discharge of fluid materials from the bins outlet into the hopper, said adjusting means being responsive to a predetermined level of the homogeneous mixture of fluid material piling up in the bottom of said hopper so as to maintain said free-fall zone in said hopper; whereby, with the application of suction in said conduit the homogeneous mixture of fluid products is drawn from said hopper into the chamber.

2. Device according to claim 1, wherein the means for mixing the said fluid products are fixed elements alternately arranged on the walls of the hopper in a manner to interrupt the free fall of the products.

3. Device according to claim 2, wherein said fixed elements are blades obliquely arranged with respect to the vertical wall of the hopper.

4. Device according to claim 2, wherein said fixed elements comprise on the one hand a series of blades distributed around a vertical shaft and forming a double helicoidal thread, said arrangement being surrounded by a cylindrical wall, and on the other hand a conical nozzle (56) provided at the lower end of the cylindrical wall.

5. Device according to claim 4, wherein said fixed elements further comprise a stack of latticework formed of wires differently directed and lodged under said nozzle.

6. Device according to claim 1, wherein the means for adjusting the outlet discharge from the bins comprise a shaft arranged horizontally and provided with longitudinal grooves, said shaft being driven in rotation at a regulated speed.

7. Device according to claims 6, wherein the axis of the horizontal shaft is perpendicular to the intermediate wall.

8. Device according to claim 7, wherein the driving of the shaft is stopped when the beam does not reach the light sensitive detector.

9. Device according to claim 1, wherein said means for adjusting the outlet discharge from the bins comprise a control device provided with level detecting means for the piling of fluid material in the bottom of the hopper.

10. Device according to claim 9, wherein said level detecting means comprise a light source which projects a horizontal light beam through the walls of the hopper and a light sensitive detector which receives said light beam as long as the piling of said products reaches a level which lies lower than that of the beam.

11. Device according to claims 10, wherein the driving of the shaft is stopped when the beam does not reach the light sensitive detector.

12. Device according to claim 1, wherein said hopper is provided with a cover part and communicates through a discharge duct with the bins, through an opening provided at the lower end thereof with the passage way of the filter elements, and through a pipe provided at its upper end with a suction source, which permits suction of the air and the dust from the hopper.

13. Device according to claim 1, wherein it comprises two bins lodged in the same enclosure, the latter being rigid and the bins being separated from one another by an intermediate wall lodged within said enclosure and extending down to the lower discharge aperture provided in the bottom of the enclosure.

14. Device according to claim 13, wherein the axis of the horizontal shaft is perpendicular to the intermediate wall.

* * * * *